Dec. 28, 1926.
L. A. TAYLOR
1,612,076
HIGH FREQUENCY CURRENT MEASURING APPARATUS
Filed March 23, 1925
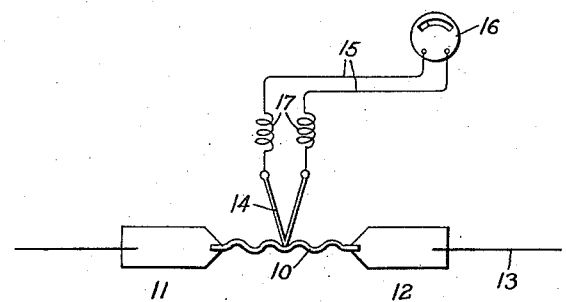
Inventor:
Laurens A. Taylor,
by
His Attorney.

Patented Dec. 28, 1926.

1,612,076

UNITED STATES PATENT OFFICE.

LAURENS A. TAYLOR, OF SCHENECTADY, NEW YORK, ASSIGNOR TO GENERAL ELECTRIC COMPANY, A CORPORATION OF NEW YORK.

HIGH-FREQUENCY-CURRENT-MEASURING APPARATUS.

Application filed March 23, 1925. Serial No. 17,623.

My invention relates to apparatus for measuring high frequency alternating currents such, for example, as radio frequency currents and in particular to a thermocouple measuring circuit for such apparatus.

A convenient way of measuring high frequency alternating currents is by the use of a low reading direct current ammeter connected to a thermocouple, the hot junction of the thermocouple being subjected to the heating effect of the high frequency current. With such an arrangement the thermocouple is placed in close proximity to a heating unit through which the high frequency current flows.

It has been found that with this arrangement the thermocouple often burns out when being used well below its maximum rating. I have discovered that this burning out is due to the high frequency currents induced into the thermocouple circuit from the circuit containing the heating element and while these induced currents do not affect the direct current instrument except indirectly, due to heating, they are a constant source of trouble due to the burning out of the thermocouple joints. In accordance with my invention these induced currents are reduced to a harmless value without interfering with the direct current functioning of the thermocouple by placing in the thermocouple circuit means for choking these high frequency induced currents. Preferably, I include air core choke coils in the instrument leads near the connection to the thermocouple.

The features of my invention which are believed to be novel and patentable will be pointed out in the claims appended hereto For a better understanding of my invention reference is made in the following description to the accompanying drawing which shows the preferred arrangement. In the drawing, 10 represents a heating element connected between suitable conducting terminals 11 and 12 in a radio frequency circuit 13. In close proximity to and preferably in contact with the heating element 10 is the thermocouple 14. This thermocouple is connected by leads 15 to the direct current instrument 16. The thermocouple is made of wire which has a small current carrying capacity and, being in close proximity to the high frequency circuit, will have induced in it high frequency currents which tend to burn out the thermocouple if these currents are not eliminated or reduced to a harmless value. The cause of this trouble is not easily detected because the induced alternating currents do not affect the reading of the direct current instrument.

By placing the choke coils 17 in one or both of the instrument leads, the induced currents are suppressed to a harmless value and the thermocouple is thus enabled to function in the ordinary manner without being subjected to the harmful effects of induced currents having a magnitude greater than that for which the thermocouple is designed. The instrument 16 is calibrated with the choke coils 17 connected in the circuit and these coils are of course designed to choke the particular frequencies passing through the heater element.

In accordance with the provisions of the patent statutes, I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. Apparatus for measuring alternating currents of radio frequency comprising a heating element subject to the heating effect of the alternating current to be measured, a thermocouple in close proximity to said heating element, a direct current instrument connected in the circuit of said thermocouple and an air core choke coil in said circuit.

2. Apparatus for measuring alternating currents of radio frequency comprising a heating element subject to the heating effect of the alternating current to be measured, a thermocouple in close proximity to said heating element, a direct current measuring instrument, leads connecting said thermocouple to said instrument and choke coils included in said leads close to the thermocouple.

In witness whereof, I have hereunto set my hand this 21st day of March 1925.

LAURENS A. TAYLOR.